United States Patent Office 3,122,558
Patented Feb. 25, 1964

3,122,558
NEW PHTHALOCYANINE DYESTUFFS
Eugen J. Koller, Binningen, and Hugo Illy, Basel, Switzerland, assignors to Ciba Limited, Basel, Switzerland
No Drawing. Original application Dec. 4, 1959, Ser. No. 857,276, now Patent No. 3,059,988, dated Oct. 23, 1962. Divided and this application June 28, 1962, Ser. No. 210,285
Claims priority, application Switzerland Dec. 18, 1958
2 Claims. (Cl. 260—314.5)

This is a divisional application of Serial No. 857,276, now matured to U.S. Patent No. 3,059,988.

The present invention provides new water-soluble phthalocyanine dyestuffs that contain at least two groups imparting solubility in water and at least one group of the general formula

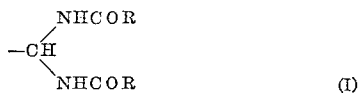
(I)

in which R represents a vinyl or β-halogen-ethyl group. More especially, this invention provides dyestuffs of the general formula

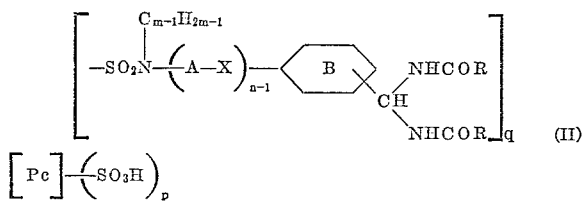
(II)

in which Pc represents the radical of a phthalocyanine group, A represents a divalent organic radical, X represents an azo- or imino-linkage, $m$ represents a whole number within the range of 1–5, $n$ represents the whole number 1 or 2, $p$ represents a whole number of at least 2, $q$ the whole number 1 or 2, and R has the same meaning as that given above. The benzene radical B may be bound directly or through the bridge A—X to the phthalocyanine-sulfonamido group. A preferably represents the radical of a coupling component, for example, a benzene or aceto-acetic-arylide, or A is a heterocyclic radical, especially the radical of a 1-phenylpyrazolone-(5).

The present invention also provides a process for the manufacture of the above dyestuffs, wherein a sulfonic acid halide or a phthalocyanine dyestuff is condensed with an organic compound containing an acylatible amino group, the uncondensed sulfonic acid halide groups are then hydrolyzed, and the condensation product thus obtained is, if desired, coupled with a diazo component, the reaction components being so chosen that the dyestuff produced contains at least two sulfonic acid groups, and one group of the Formula I.

As starting materials for the present process, there may be used metal-free or metalliferous phthalocyanines such, for example, as the zinc, cobalt, nickel, and especially the copper phthalocyanines. Especially useful compounds are the copper phthalocyanines containing sulfonic acid groups. Depending on whether 4-sulfophthalic acid is used as starting material for making these sulfonated phthalocyanine compounds, or whether these are obtained by sulfonation or sulfochlorination of copper phthalocyanine, the sulfonic acid groups in the resulting phthalocyanine molecule are in the 4- or 3-position respectively. The phthalocyanine compound used as starting material that may also contain a sulfonic acid group, must contain at least one sulfonic acid halide group. Such a sulfonic acid halide compound may be obtained, for example, by reacting a phthalocyanine tri- or tetra-sulfonic acid with an agent capable of forming acid halides, such, for example, as a phosphorus halide, thionyl chloride or chlorosulfonic acid, and by partially hydrolyzing the sulfo-halide thus obtained.

The resulting starting material is treated with an organic compound containing an acylatible amino or hydroxyl group, for example, with a compound of the general formula

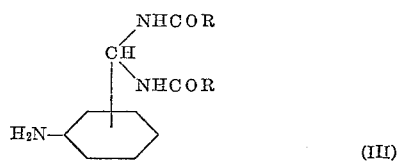
(III)

in which R has the meaning given above, and in which the benzene radical may contain other substituents such, for example, as alkyl groups or halogen atoms, and blue dyestuffs are thus obtained.

The compounds of Formula III may be obtained by reduction of the corresponding nitro-compounds under conditions such that the acid groups are not split off, advantageously by catalytic hydrogenation. The nitro-compounds may be obtained according to the process of U.S. specification No. 2,475,846, by condensation of one molecular proportion of a nitro-aldehyde with 2 molecular proportions of β-chloro-propionic acid amide or acrylic acid amide, in the presence of a strong acid, especially hydrochloric acid or sulfuric acid.

The phthalocyanine sulfochlorides may, alternatively, be condensed with a coupling component, which, apart from containing a coupling group, also contains an acylatible amino group, and the condensation product thus obtained is coupled with a diazo compound containing the group —CH(NHCOR)$_2$, advantageously with the diazo compounds of the amines of Formula III. In this manner, green dyestuffs are obtained. As coupling components containing an acylatible amino group, there may be used an amino phenol for example, 1:3 or 1:4-amino-phenol, an amino-aceto-acetic-arylide, for example, 1-amino-3- or 4-aceto-acetic anilide, an amino pyrazolone, especially a 1-amino-phenyl-5-pyrazolone such, for example, as 3'- or 4'-amino-phenyl-3-methyl pyrazolone-5 or 3'- or 4'-amino-phenyl-3-carboxy pyrazolone-5, and these coupling components may also contain a sulfonic acid group bound to the benzene radical.

Advantageously, the coupling component is heated before the coupling reaction, in a weakly alkaline medium until any sulfochloride groups still present have been completely hydrolyzed. The coupling reaction with the diazo compound is advantageously carried out in a weakly acid, neutral or alkaline medium, for example, in a medium containing an alkali metal bicarbonate and preferably in the cold.

The dyestuffs obtained by the present process are useful for colouring or printing a very wide variety of materials, especially polyhydroxylated fibrous materials, such, for example, as cellulose fibers or synthetic fibers, such for example, as those derived from polyvinyl alcohol, regenerated cellulose, and also for colouring or printing natural products, for example, linen and especially cotton materials. The dyestuffs may be used either in the so-called "direct dyeing method" or in a printing or pad-dyeing process, in which the material that is to be dyed is treated with the dyestuff which is then fixed by a heat treatment, of example, a steam treatment in the presence of an alkali. Advantageously, the fixation of the dyestuff on the material is carried out in the presence of a fairly strong alkali such, for example, as an alkali metal hydroxide, so that an improved fixation of the dyestuff is obtained. Thus, good results are obtained by carrying out the fixation in a medium having a pH-value greater than 9, but still better results are obtained in a medium having a pH-value above 10.

The dyeings on cellulosic fibers, with the dyestuffs of this invention, are distinguished by the purity of their tints, their good fastness to light and, above all, by their good fastness to washing.

In certain cases, it may be of advantage to after-treat the dyeings obtained in the above manner. Thus, for example, the dyeings may advantageously be soaped whereby any unfixed dyestuff is completely removed.

The dyestuff of this invention may also be used for dyeing and printing nitrogen-containing materials, such, for example, as leather, silk and especially woollen materials containing nitrogen, and above all for dyeing and printing fibers of a super polyamide or of a super polyurethane in weakly alkaline media.

The dyeings on wool have an excellent fastness to washing and fulling.

The following examples illustrate the invention, the parts and percentages being by weight unless otherwise indicated, and the relationship of parts by weight to parts by volume being the same as that of the gram to the cubic centimeter.

*Example 1*

28.8 parts of copper phthalocyanine are stirred into 275 parts of chlorosulfonic acid at such a rate that the temperature does not rise above 30° C., and the reaction mixture is stirred on for ½ hour at room temperature, heated within 1½ hours to an internal temperature of 130 to 133° C. and stirred for 4 hours at the same temperature. The mixture is allowed to cool and vigorously stirred into a mixture of 250 parts of water, 140 parts of sodium chloride and 1500 parts of crushed ice. It must be ensured that the temperature does not rise above 3° C. during this operation. The reaction mixture is stirred for a short time, filtered and washed on the suction filter with a mixture of 300 parts by volume of saturated sodium chloride solution and 150 parts of ice.

The resulting sulfochloride, in the form of an acid paste, is stirred with 150 parts of ice and adjusted with dilute, cold sodium hydroxide solution to a pH value of 6.5 to 7.0.

16 parts of the compound of the formula

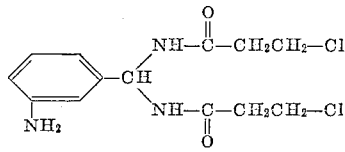

are dissolved with heating in 280 parts by volume of acetone, and this solution is added to the thoroughly stirred, neutralized sulfochloride paste. Immediately, 25 parts by volume of pyridine are added and the whole is stirred for 24 hours at room temperature. Addition of concentrated hydrochloric acid until a distinct acid reaction to Congo red is reached precipitates the dyestuff which is filtered off, pasted with water, adjusted with dilute sodium hydroxide solution to a pH value of 7.5 and made up to 1000 parts by volume with water. The mixture is stirred for some time at 30 to 40° C. while maintaining a weakly alkaline reaction, whereupon all but traces of the dyestuff passes into solution. The solution is filtered. The dyestuff is salted out with sodium chloride from the filtrate, filtered and then dried in vacuo.

The dyestuff obtained in this manner produces on cotton and viscose rayon by the method described in Example 6 a turquoise print which is fast to washing.

A similar dyestuff is obtained by using the sulfochloride described in Example 2 and condensing it with meta-aminobenzylidene - di - β - chloropropionylamide as described in Example 1.

*Example 2*

A mixture of 28.8 parts of copper phthalocyanine and 155 parts by volume of chlorosulfonic acid is thoroughly stirred and heated within 1 to 1½ hours to 140° C., and then kept for 2 hours at 138 to 140° C., allowed to cool to 80 to 85° C. and slowly treated dropwise with 25 parts by volume of thionyl chloride, then heated to 90 to 93° C. and stirred for 3 hours at the same temperature.

The reaction mixture is poured into a mixture of 140 parts of sodium chloride and 1500 parts of ice and water, filtered, and the filter residue is thoroughly washed with ice water.

The sulfochloride is turned with 75 parts of water and 75 parts of ice into a fine paste by stirring and then adjusted with dilute sodium hydroxide solution at 0° C. to a pH value of 7 to 7.3.

44 parts of 1-(3'-aminophenyl)-5-pyrazolone-3-carboxylic acid are dissolved under neutral conditions with addition of 20 parts of sodium carbonate in 150 parts of water, and the whole is added to the neutralized sulfochloride paste, 20 parts by volume of pyridine are added to the reaction mixture and the whole is stirred for 24 hours at room temperature.

To isolate the dyestuff the cold solution is adjusted with concentrated hydrochloric acid to an acid reaction to Congo red and the precipitated product is filtered off. To remove any uncondensed aminophenylpyrazolone component as far as possible, an alkaline solution of the dyestuff is prepared, from which it is again precipitated with hydrochloric acid and filtered off, then again dissolved in water at a pH of 6 to 6.6 and treated with heating under weakly alkaline conditions until any remaining sulfochloride groups have been hydrolyzed. The dyestuff is then salted out at 60 to 65° C. with sodium chloride, filtered and washed.

This coupling component is dissolved in 500 parts of water with addition of 50 parts of sodium bicarbonate. 31.8 parts of meta-aminobenzylidene-di-β-chloropropionylamide are diazotized in the usual manner with hydrochloric acid and sodium nitrite. This diazonium solution is slowly added at 0 to 10° C. to the above alkaline solution of the coupling component. On completion of the coupling the precipitating green dyestuff is filtered off. To convert it into a readily water-soluble form it is stirred with cold water, dissolved with addition of 35 parts by volume of N-sodium hydroxide solution and turned into a solid powder in a spray-drier.

When cotton is printed with this dyestuff by the method described in Example 6, brilliant green tints fixed fast to washing are obtained.

When applied as described in Example 7, the dyestuff produces dyeings that are fast to washing.

*Example 3*

28.8 parts of copper phthalocyanine are added with cooling to 141 parts by volume of chlorosulfonic acid. The mixture is stirred for 1 hour at 70 to 75° C. and in the course of 1½ hours raised to 130 to 132° C. and stirred at the same temperature for 4 hours, cooled to 80° C. and in the course of 1 hour treated dropwise with 60 parts by volume of thionyl chloride and then stirred on for 1 hour at 70 to 80° C. The mixture is then cooled to room temperature and poured over ice. The copper phthalocyanine sulfochloride is suctioned off and thoroughly washed with ice water. The filter cake is pasted with ethanol, filtered, washed with ethanol and dried in vacuo at 60° C.

With cooling and stirring the above sulfochloride is added to a solution of 66 parts of ortho-benzenesulfonate of 1-[3'-aminophenyl]3-methyl-5-pyrazolone in 200 parts of pyridine, and the reaction mixture is stirred for 24 hours at room temperature, poured into 800 parts by volume of ethanol, filtered and washed with ethanol. To hydrolyze the orthobenzenesulfonate grouping the dyestuff is heated for 1 hour at 80 to 90° C. with 400 parts by volume of an N-sodium hydroxide solution and 16 parts by volume of pyridine. The dyestuff precipitates on addition of concentrated hydrochloric acid: it forms a coupling component which is coupled at 0 to 10° C., in the form of an aqueous solution and in the presence of excess sodium carbonate, witht he diazonium compound prepared by diazotizing 21 parts of 3-aminobenzylidene-di-acrylamide with hydrochloric acid and sodium nitrite. On completion of the coupling the precipitated dyestuff which is the mixture of about 60% of the disazophthalocyanine and 40% of the monoazophthalocyanine dyestuff is filtered off and dried in vacuo.

When the 3-aminobenzylidene-di-acrylamide is replaced by an equivalent amount of 3-aminobenzylidene-bis-[β-chlorpropionyl]-amide, a similar dyestuff results. In this case good solubility in water is achieved by converting the dyestuff into its enolate form with the theoretical amount of sodium hydroxide solution and further working it up in a spray-drier.

When cotton is printed with this dyestuff as described in Example 6, green tints are obtained which are fast to washing.

*Example 4*

24.6 parts of the sodium salt of copper phthalocyanine-3:4':4'':4'''-tetrasulfonic acid are added to 75 parts by volume of chlorosulfonic acid, and the reaction mixture is heated to 80 to 83° C. with thorough stirring. In the course of 1 hour 27 parts by volume of thionyl chloride are added dropwise, the mixture is allowed to react for 4 hours at 80 to 85° C. and the sulfochloride is poured over ice in the usual manner, suctioned off and washed with ice water on the filter.

The sulfochloride is turned with ice into a fine paste and while cold adjusted with dilute sodium hydroxide solution to a pH value of 7.0. 8.3 parts of meta-aminobenzylidene-di-β-chloropropionylamide are dissolved with heating in 130 parts by volume of acetone, the solution is added to the neutralized sulfochloride paste and the whole is immediately treated with 22 parts by volume of pyridine. The mixture is allowed to react for 48 hours at room temperature and while cold acidified with concentrated hydrochloric acid. The precipitated dyestuff is turned with saturated sodium chloride solution into a filterable form and suctioned off. The dyestuff is then stirred with ice and adjusted with dilute sodium hydroxide solution to a pH value of 8, and then salted out with sodium chloride at 40° C.

On being printed on cotton as described in Example 6, this dyestuff produces blue tints which are fast to washing.

*Example 5*

19.4 parts of dry copper phthalocyanine-3:3':3'':3'''-tetrasulfochloride are stirred with cooling into a solution of 5.65 parts of 1-amino-2-methoxy-4-acetoacetylamino-5-chlorobenzene in 90 parts by volume of pyridine.

The reaction mixture is stirred for 24 hours at room temperature and worked up by being poured into ethanol, suction-filtered and the product is thoroughly washed on the filter with ethanol.

The dyestuff is dissolved in water with addition of excess sodium hydroxide solution and a small amount of pyridine.

At the same time 6.4 parts of meta-aminobenzylidene-di-β-chloropropionylamide are dissolved in 150 parts of water and 5 parts by volume of concentrated hydrochloric acid and in the cold diazotized with 20 parts by volume of an N-sodium nitrite solution. This diazonium compound is slowly added to the coupling component prepared as described above, and on completion of the coupling the pH is adjusted to 7. In the cold 20 parts by volume of N-sodium hydroxide solution are added, and the product is dried in a spray-drier.

The resulting dyestuff produces on cotton by the method described in Example 6 green prints that are fast to washing.

*Example 6*

A solution of 30 parts of the dyestuff obtained in Example 2 in 339 parts of water is treated with 150 parts of urea, the whole is poured into 450 parts of a sodium alginate thickener, and the mixture is treated with 30 parts of potassium carbonate and 1 part of sodium hydroxide solution of 40% strength. A cotton fabric is printed in the usual manner with the resulting printing paste and then dried, steamed for 5 minutes at 100 to 101° C., rinsed, soaped, again rinsed and finally dried. This procedure yields brilliant green prints.

*Example 7*

5 parts of the dyestuff prepared as described in Example 2 are mixed with 80 parts of trisodium phosphate and dissolved in 40 parts of water and the whole is made up with water to 4000 parts. 80 parts of sodium chloride are added, and 100 parts of a cotton fabric are immersed in the resulting dyebath; the temperature is raised within ½ hour to 60° C., another 80 parts of sodium chloride are added, the temperature is raised to 80° C. within 15 minutes, and the whole is kept at this temperature for ½ hour. The dyeing is then rinsed and soaped for 15 minutes in a boiling 0.3% solution of a non-ionic detergent. The dyed fabric displays excellent fastness properties.

A similarly good result is achieved when in the above example sodium carbonate is used instead of trisodium phosphate.

What is claimed is:

1. The dyestuff of the formula

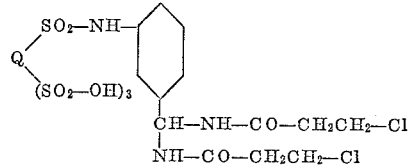

wherein Q is the copper phthalocyanine radical which bears the —$SO_2$— groups in the 3,3',3'' and 3''' positions.

2. The dyestuff of the formula

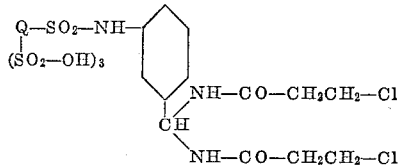

wherein Q is the copper phthalocyanine radical which bears the —$SO_2$— groups in the 3,4',4'', and 4''' positions.

No references cited.